Jan. 19, 1926. 1,570,408
P. STEVENSON, JR
DEVICE FOR DISPLAYING PRINTED OR OTHER MATTER EMPLOYED IN SIGHT
TESTING AND WHICH CAN ALSO BE USED AS A MIRROR
Filed March 25, 1924   2 Sheets-Sheet 1
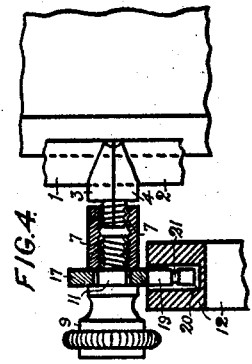
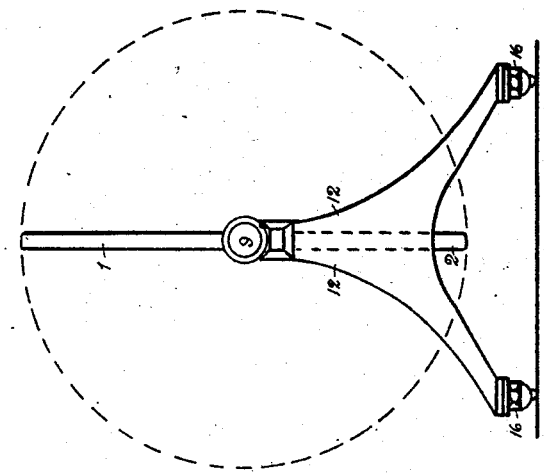
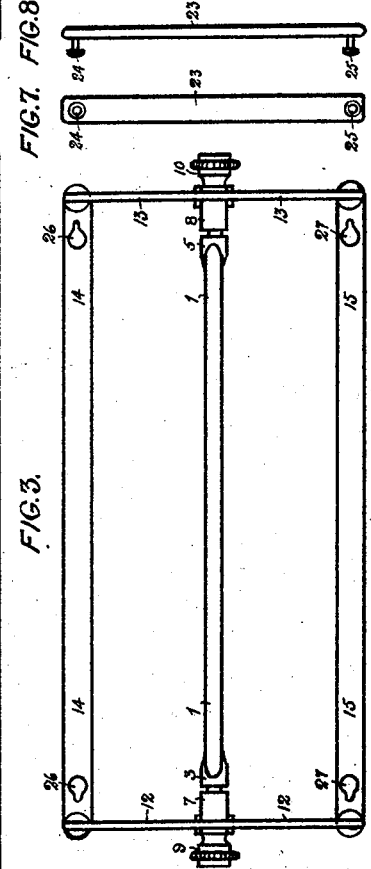
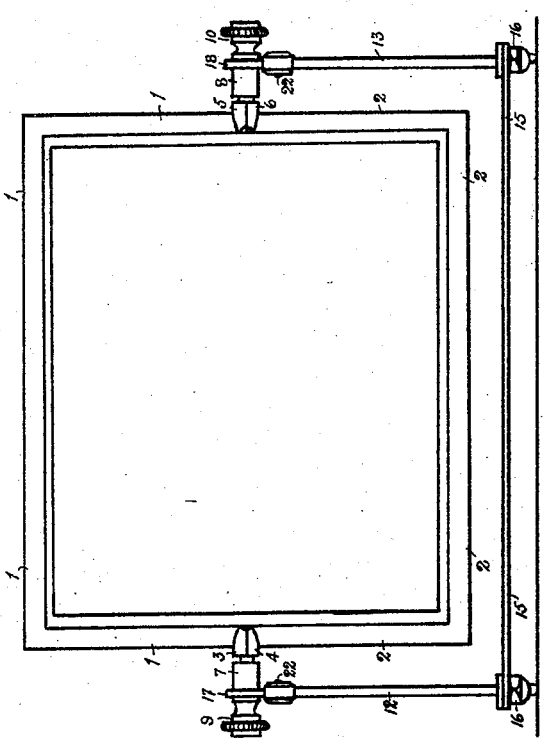
Inventor
Peter Stevenson Jr.
By William Clinton
Attorney Jan. 19, 1926. 1,570,408
P. STEVENSON, JR
DEVICE FOR DISPLAYING PRINTED OR OTHER MATTER EMPLOYED IN SIGHT
TESTING AND WHICH CAN ALSO BE USED AS A MIRROR
Filed March 25, 1924 2 Sheets-Sheet 2
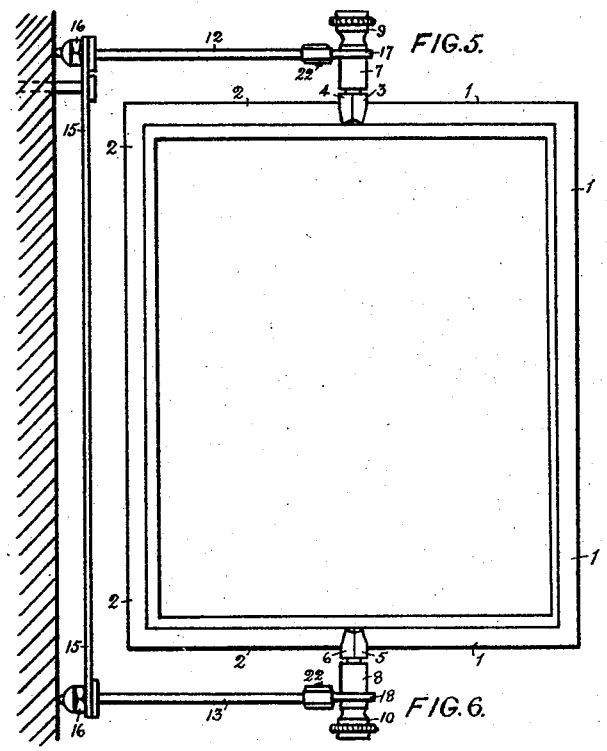
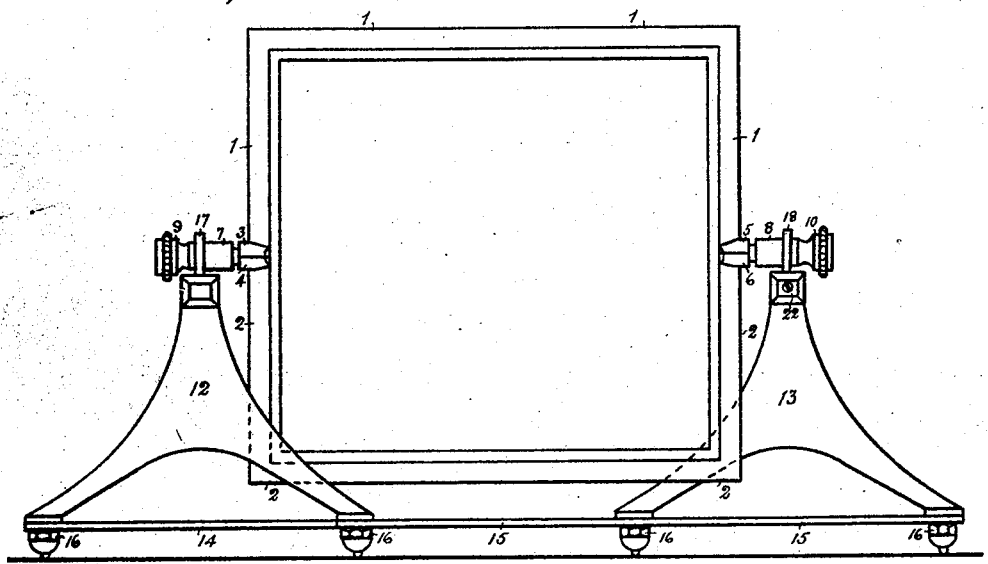
Inventor
Peter Stevenson Jr.
By William Clinton
Attorney Patented Jan. 19, 1926.

1,570,408

UNITED STATES PATENT OFFICE.

PETER STEVENSON, JR., OF EDINBURGH, SCOTLAND.

DEVICE FOR DISPLAYING PRINTED OR OTHER MATTER EMPLOYED IN SIGHT TESTING AND WHICH CAN ALSO BE USED AS A MIRROR.

Application filed March 25, 1924. Serial No. 701,852.

*To all whom it may concern:*

Be it known that I, PETER STEVENSON, Junior, a subject of the King of Great Britain and Ireland, residing at 7 Forrest Road, Edinburgh, county of Midlothian, Scotland, have invented certain new and useful improvements in a device for displaying printed or other matter employed in sight testing and which can also be used as a mirror; and I do hereby declare that the following is a full, clear, and exact description of the invention, such as will enable others skilled in the art to which it appertains to make and use the same.

My invention has for its object in a simple and inexpensive manner to provide a device for conveniently displaying, at any suitable angle, printed or other matter used in connection with sight testing. The device can also be used as a mirror, with or without the sight testing matter.

In carrying out my invention the device, which may be made of any suitable material, consists of a frame divided transversely into two parts: The object of dividing the frame into two parts, is to facilitate the removal of the mirror and its replacement by another mirror or the like. The adjoining ends, of each part, have an outwardly projecting member consisting of a half screw, and so that when the adjoining ends of the frame are brought together, a complete screwed member is formed on each side of the frame. The two parts of the frame are held in position by an internally screwed sleeve adapted to engage with each screwed member. The outer end of each internally screwed sleeve engages with a knurled screw, or the like, having a plain shoulder, and the shoulder, on each screw, forms a bearing for mounting it on a pedestal, so that the frame can be turned through its horizontal axis to any convenient angle.

The pedestal consists of two upright members, detachably secured to two horizontal members by nuts or the like, so that when not in use and detached from the frame, the two horizontal members can be collapsed, like a parallel ruler, whilst at the same time the upright members are turned, so that the space occupied, in one direction, only amounts to the combined breadth of the two horizontal members.

The top, or that part, of each upright member, in which the frame is supported, may be made detachable. For example, it may be provided with a depending part which is inserted in a socket in the upright member, the depending part having a circumferential groove formed in it with which engages a pin, inserted in an aperture at right angles to the socket.

Where the device is intended to be used as a hanging mirror, a bracket or plate is fixed to one of the upright members, of the pedestal, so that it can be turned outwards to engage with a nail or the like on the wall,— in this position the mirror can be turned through its vertical axis to any convenient angle.

The back of the frame may be ornamented as desired, or arranged to hold sight testing charts, photographs, or the like.

In order that my said invention and the manner of performing the same may be properly understood, I hereunto append two sheets of explanatory drawings to be hereinafter referred to in describing my invention.

Figures 1, 2, and 3, are respectively, a front elevation, end elevation, and a plan of the device. Figure 4, is a sectional elevation showing the connection of the top of one upright member, and also the frame. Figure 5, shows the device in a hanging position, and Figure 6, shows the device in its collapsed position. Figures 7, and 8, show a plan, and a side elevation of a strap or cross bar. In these drawings the same reference numerals are used to mark the same or like parts wherever they are repeated.

As shown in the drawings, the device consists of a frame divided into two parts 1, and 2, the adjoining ends of each part having an outwardly projecting member consisting respectively of a half screw 3, 4, and 5, 6, so that when the adjoining ends of the frame are brought together, a complete screwed member is formed on each side of the frame. The two parts 1, and 2, of the frame, are held in position by an internally screwed sleeve 7, and 8, adapted to engage with each screwed member, as shown in Figure 4. The outer end of each internally screwed sleeve 7, and 8, engages with a knurled headed screw 9, and 10, having a plain shoulder 11, and the shoulder, on each screw 9, and 10, forms a bearing for mounting it on a pedestal, so that the frame can be turned through its horizontal axis to any convenient angle.

The pedestal consists of two upright members 12, and 13, detachably secured to two horizontal members 14, and 15, by nuts 16, so that when not in use the two horizontal members can be collapsed, like a parallel ruler, whilst at the same time the upright members 12, and 13, are turned approximately through a quarter of a revolution, as that the space occupied in one direction, only amounts to the combined breadth of the two horizontal members 14, and 15. To enable the collapsing action to be effected without removing the frame, the top part 17, and 18, of each upright member 12, and 13, in which the frame is supported, is made detachable, and is provided with a depending part 19, which is inserted in a socket 20, in the upright member 12, (Figure 4), said depending part having a circumferential groove 21, formed in it with which engages a pin 22, inserted in an aperture, in the upright member 12, at right angles to the socket 20. In this way the main portion of each upright member 12, and 13, can be turned without turning the top parts 17, and 18, in which the frame is supported.

Where the device is intended to be used as a hanging mirror (Figure 3) it is provided with a strap or cross bar 23, provided with lugs 24, and 25, which engage respectively in elongated apertures 26, and 27, in the horizontal members 14, and 15, and in this position the mirror can be turned through its vertical axis to any convenient angle.

By constructing the device, as just described, it can be simply and expeditiously collapsed, or dismantled, thus occupying a comparatively small space, and eliminating risk of breakage, and readily re-erected.

What I claim is:—

The herein described device comprising a frame, upright members adjacent said frame, heads detachably mounted on said upright member, bearings carried by said heads, projections on said frame, screwed sleeves receiving said projections, means for supporting said projections consisting of a member connected to each sleeve and having a plain shoulder adapted to project into one of said bearings in the head of each upright member, whereby the uprights may turn independently of said heads.

In witness whereof I have hereunto set my hand.

PETER STEVENSON, Junior.